United States Patent
You

(10) Patent No.: US 6,976,722 B2
(45) Date of Patent: Dec. 20, 2005

(54) GLOVE BOX ASSEMBLY FOR AUTOMOBILES

(75) Inventor: Young-chin You, Suwon-shi (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 10/744,005

(22) Filed: Dec. 24, 2003

(65) Prior Publication Data
US 2005/0104400 A1    May 19, 2005

(30) Foreign Application Priority Data
Nov. 19, 2003  (KR)  .................. 10-2003-0082289

(51) Int. Cl.$^7$ ............................................. B60R 7/06
(52) U.S. Cl. ............................ 296/37.12; 292/336.3
(58) Field of Search ........................ 296/37.1, 37.8, 296/37.12, 70, 1.07; 292/336.3

(56) References Cited

U.S. PATENT DOCUMENTS

| | | | | |
|---|---|---|---|---|
| 4,223,940 A | * | 9/1980 | Janz et al. ............... | 296/37.12 |
| 5,823,612 A | | 10/1998 | Angelo | |
| 6,152,512 A | * | 11/2000 | Brown et al. ............ | 296/37.12 |
| 6,164,711 A | * | 12/2000 | Neal et al. ............... | 296/37.12 |
| 6,669,243 B2 | * | 12/2003 | Katoh et al. .................. | 292/34 |

FOREIGN PATENT DOCUMENTS

JP    2001-98818    4/2001

OTHER PUBLICATIONS

English Language Abstract of JP 2001-98818.

* cited by examiner

Primary Examiner—Patricia L. Engle
(74) Attorney, Agent, or Firm—Greenblum & Bernstein, P.L.C.

(57) ABSTRACT

A glove box assembly has an identifying member formed therein. A knob of the glove box assembly, which is selectively mounted onto the left or right side of an instrument panel of an automobile, is assembled with ease. The glove box assembly includes a housing selectively mounted onto the left or right side of an instrument panel or a driver's seat of an automobile. The glove box assembly includes a lid rotatably attached to the front part of the housing, a knob rotatably fitted to the lid such that the housing is opened or closed by the lid, and an identifying member that identifies the appropriate knob, which is configured to be fitted into the lid of the glove box assembly corresponding to the left side or right side of an automobile.

14 Claims, 5 Drawing Sheets

GLOVE BOX ASSEMBLY FOR AUTOMOBILES

RELATED APPLICATION

The present disclosure relates to subject matter contained in Korean application No. 2003-82289, filed on Nov. 19, 2003, which is herein expressly incorporated by reference its entirety.

BACKGROUND OF THE INVENTION

1. Field of the Invention

The present invention relates to a glove box assembly for automobiles, and more particularly to a glove box assembly having an identifying member formed therein, by means of which a knob of the glove box assembly selectively mounted in the left or right side of an instrument panel of an automobile is easily assembled while being viewed with the naked eye of a worker.

2. Description of the Related Art

Generally, an automobile is provided at various areas with storage compartments for storing various kinds of articles.

Specifically, the automobile includes a trunk for storing relatively large articles, and a glove box assembly for storing relatively small articles.

If articles are too large or too long to be stored in the trunk of the automobile or in the interior of the automobile, an additional storage unit may be mounted to the roof of the automobile.

FIG. 1 is an exploded perspective view showing a conventional glove box assembly 10 for automobiles. As shown in FIG. 1, the conventional glove box assembly 10 comprises: a housing 13 mounted in an instrument panel 2 disposed in front of a passenger seat (not shown) of the automobile; and a lid 11 attached to the front part of the housing 13.

The top of the housing 13 of the glove box assembly 10 is opened. At either side of the housing 13 adjacent to the lower end of the housing 13 is formed a hinge 12, by means of which the housing is mounted into the instrument panel 2 in such a manner that the housing 13 is inserted into or drawn out from the instrument panel 2 while being rotated about the hinge 12.

Also, the glove box assembly 10 is provided with a locking unit for selectively locking the glove box assembly 10 in the instrument panel 2.

The locking unit is fixed to the upper part of the lid 11 of the glove box assembly 10.

The locking unit comprises: a knob 14 rotatably fitted to the upper part of the lid 11 such that the knob 14 is pulled upward; a locker 16 attached to the inside of the knob 14 such that the locker 16 is moved in the same fashion as the knob 14; and a striker 4 fixed to the inside of the instrument panel 2 by means of bolts 6 such that the locker 16 is caught by the striker 4.

In the glove box assembly 10 constructed as described above, the housing 13 of the glove box assembly 10 remains inserted in the instrument panel 3 at normal times. When a passenger pulls the knob 14 upward to take out articles from the housing 13, the locker 16 attached to the inside of the knob 14 is separated from the striker 4 so that the housing 13 is rotated about the hinge 12. Consequently, the glove box assembly 10 is drawn out of the instrument panel 2.

The construction of the above-mentioned locking unit of the glove box assembly is disclosed in Japanese Unexamined Patent Publication No. 2001-098818.

In the conventional glove box assembly, however, the shape of the knob varies, depending upon whether the glove box assembly is mounted on the left or right side of the instrument panel. As a result, the knob may be inappropriately assembled in the glove box, and thus the knob may be damaged.

SUMMARY OF THE INVENTION

Therefore, the present invention has been made in view of the above problems, and it is an object of the present invention to provide a glove box assembly having an identifying member formed therein, by means of which a knob of the glove box assembly is properly fitted in a lid of the glove box assembly on the basis of the lid of the glove box assembly mounted in the left or right side of an instrument panel of an automobile In accordance with the present invention, the above and other objects can be accomplished by the provision of a glove box assembly for automobiles comprising: a housing selectively mounted to the left or right side of an instrument panel from a driver seat of the automobile; a lid rotatably attached to the front part of the housing; a knob rotatably fitted in the lid such that the housing is opened or closed by means of the lid; and an identifying member for identifying the knob fitted into the lid.

BRIEF DESCRIPTION OF THE DRAWINGS

The above and other objects, features and other advantages of the present invention will be more clearly understood from the following detailed description taken in conjunction with the accompanying drawings, in which:

FIG. 4a is a sectional view of the glove box assembly shown in FIG. 3a; and

DESCRIPTION OF THE PREFERRED EMBODIMENTS

Now, a preferred embodiment of the present invention will be described in detail with reference to the accompanying drawings.

Figure 1:
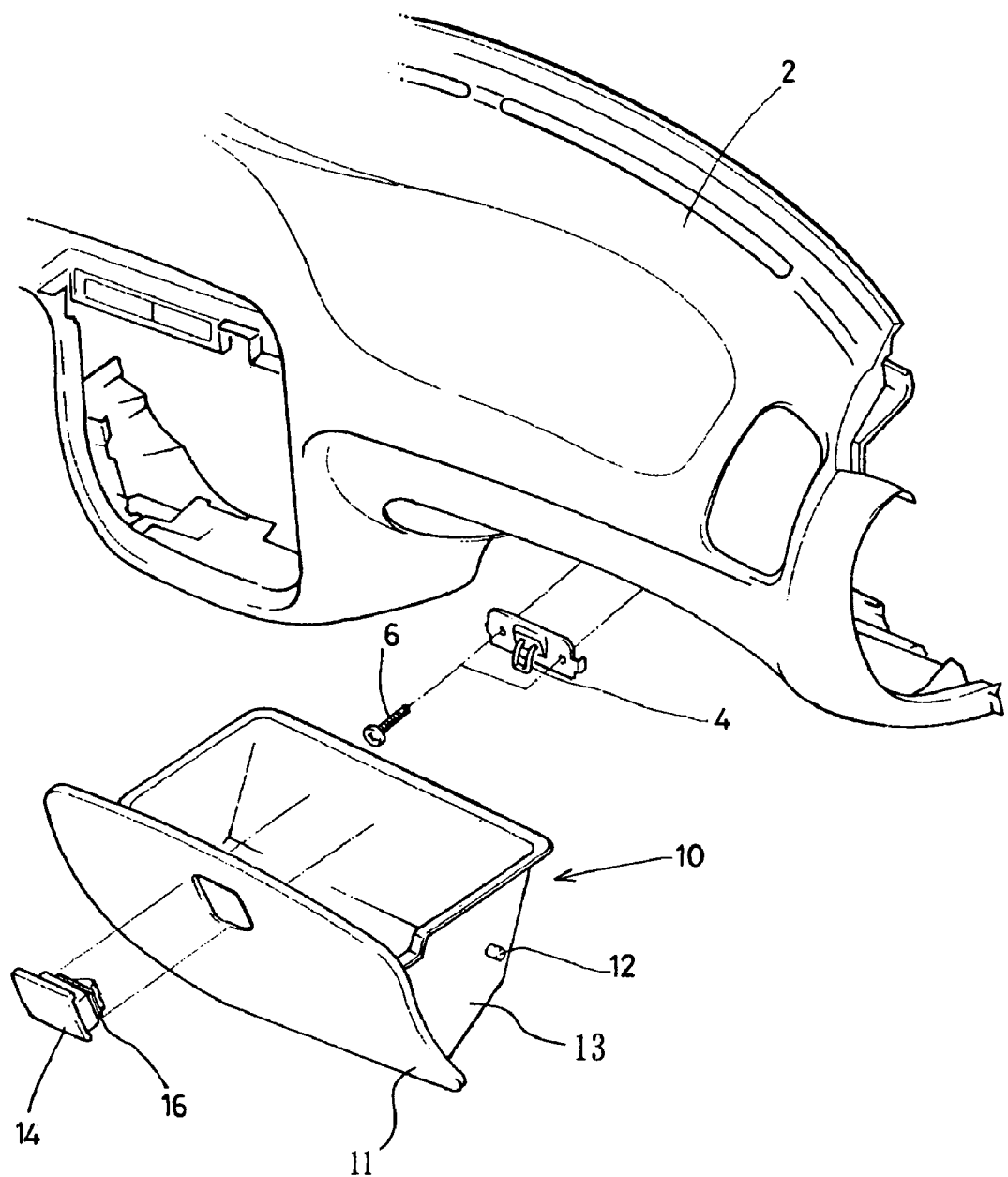
FIG. 1 is an exploded perspective view showing a conventional glove box assembly for automobiles.
Figure 2:
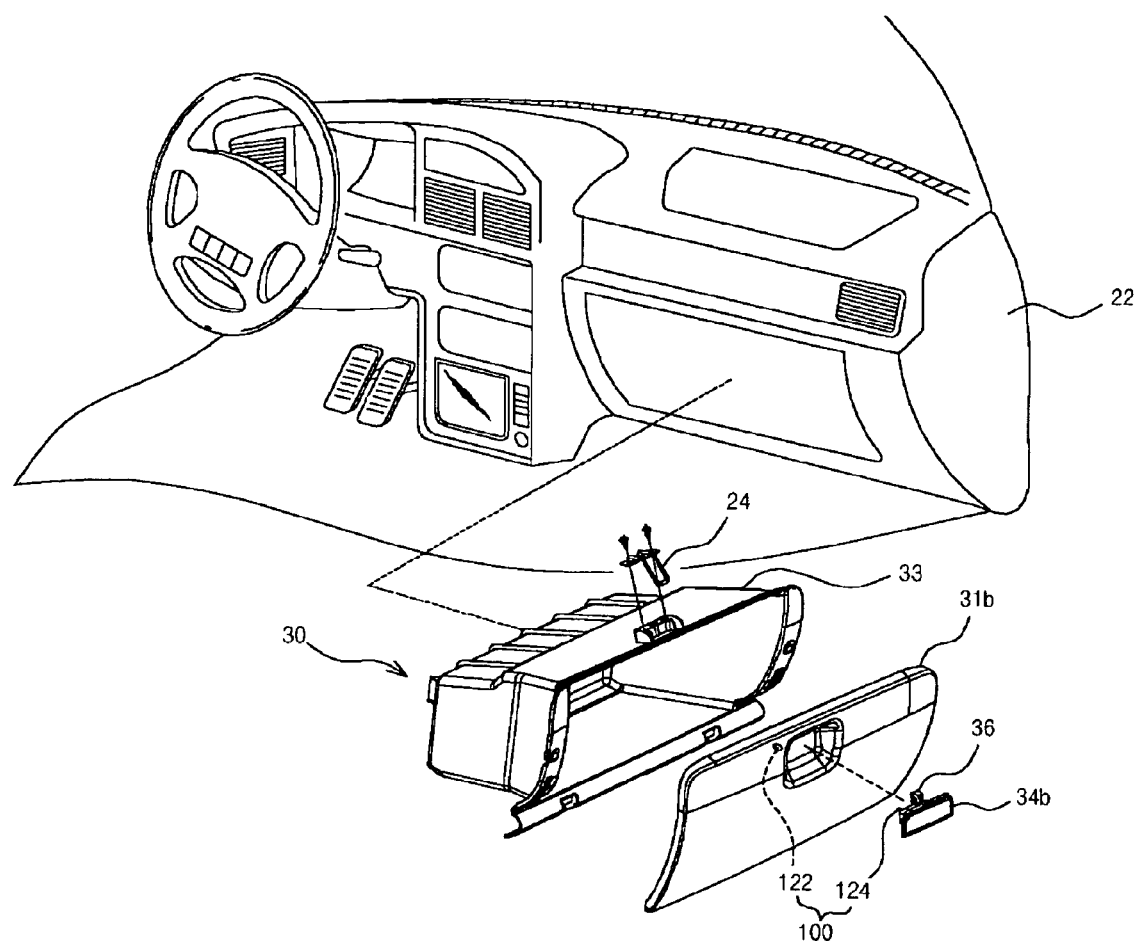
FIG. 2 is an exploded perspective view showing a glove box assembly for automobiles according to a preferred embodiment of the present invention.

FIG. 2 is an exploded perspective view showing a glove box assembly 30 for automobiles according to a preferred embodiment of the present invention.

Figure 3A:
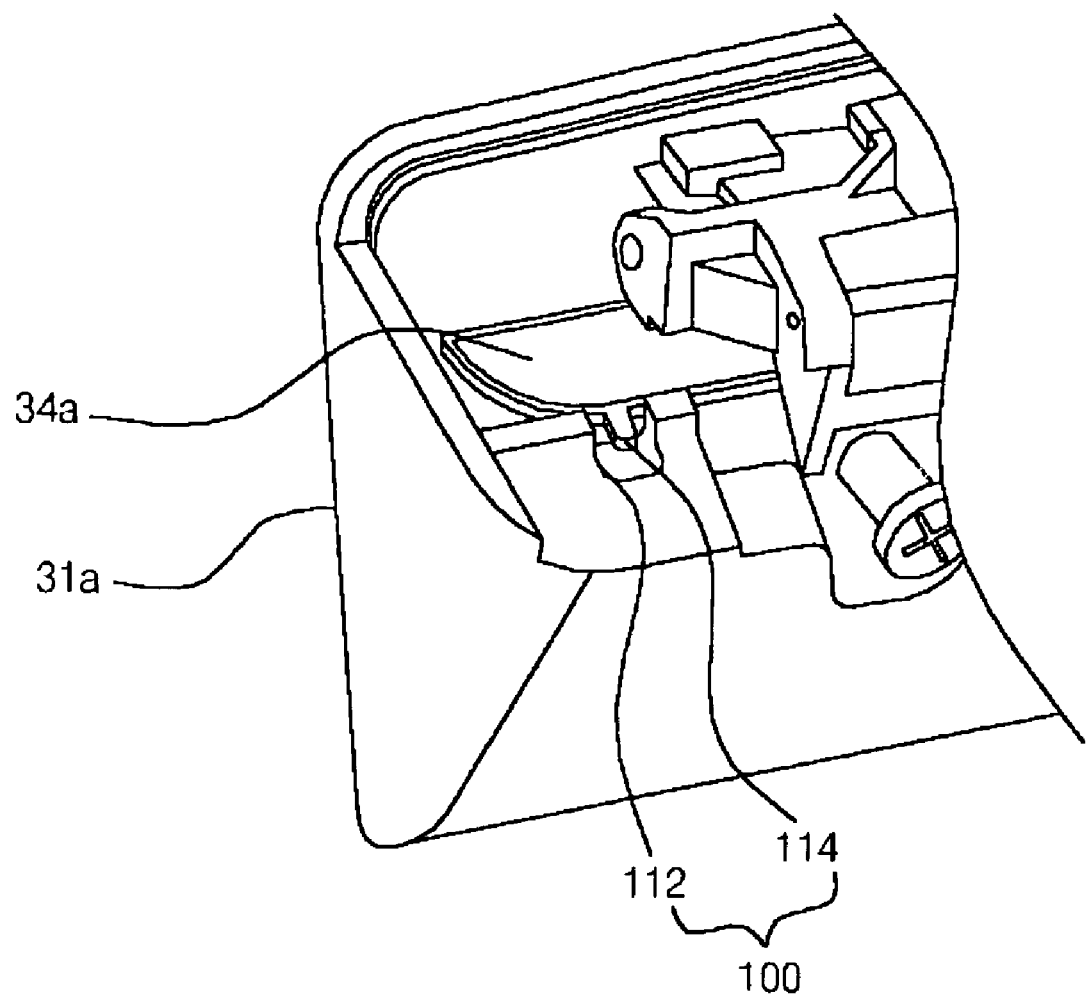
FIG. 3a is a view showing a knob fitted in a lid of the glove box assembly in case the glove box assembly is mounted in the left side of an instrument panel.
Figure 3B:
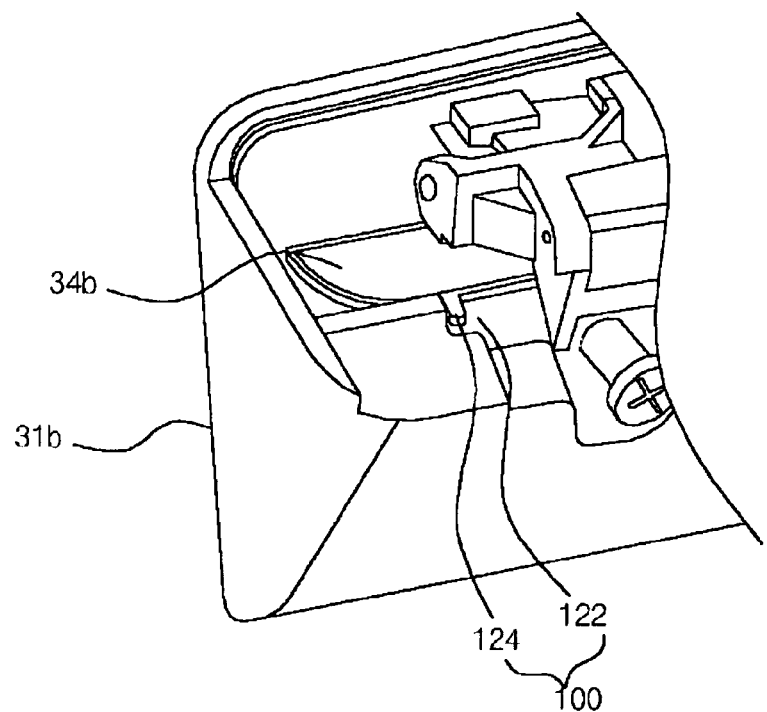
FIG. 3b is a view showing a knob fitted to a lid of the glove box assembly in the case that the glove box assembly is mounted in the right side of an instrument panel.
Figure 4A:
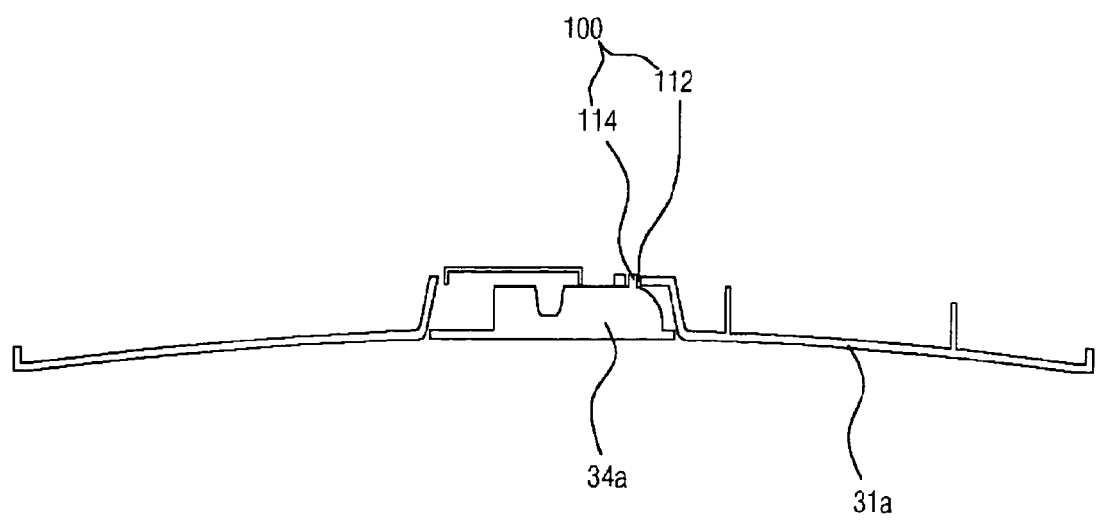
Figure 4B:
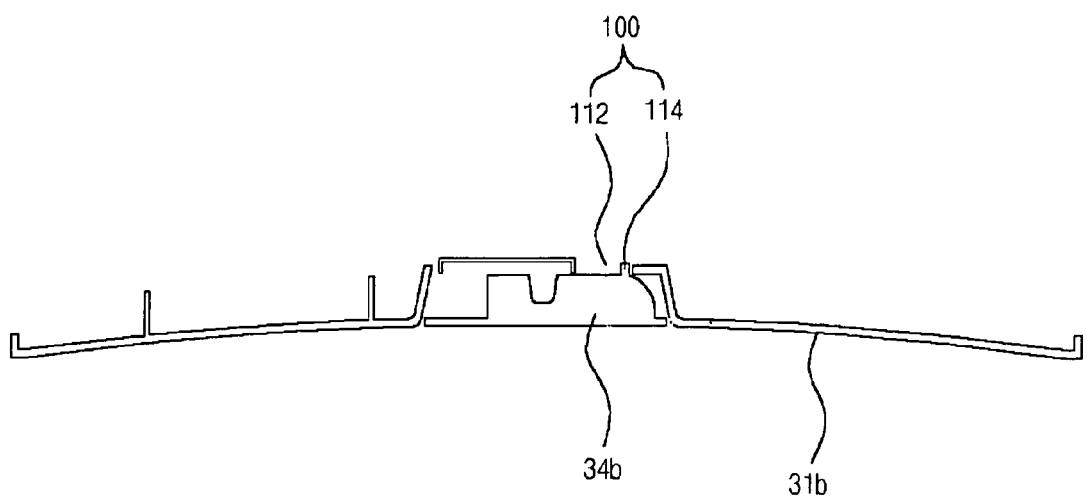
FIG. 4b is a sectional view of the glove box assembly shown in FIG. 3b.

FIG. 3a is a view showing a knob fitted to the lid of the glove box assembly if the glove box assembly is mounted to the left side of an instrument panel of an automobile, and FIG. 3b is a view showing a knob fitted in a lid of the glove box assembly in the case the glove box assembly is mounted to the right side of an instrument panel of an automobile. FIG. 4a is a sectional view of the glove box assembly shown in FIG. 3a, and FIG. 4b is a sectional view of the glove box assembly shown in FIG. 3b.

As shown in FIGS. 2 to 4b, the glove box assembly 30 comprises a housing 33 selectively mounted to the left or right side of an instrument panel 22 from the driver's seat of the automobile, a lid 31a; 31b rotatably attached to the front part of the housing 33, a knob 34a; 34b rotatably fitted in the lid 31a; 31b such that the housing 33 is opened or closed by means of the lid 31a; 31b, and an identifying member 100 for identifying the knob 34a; 34b fitted into the lid 31a; 31b.

The glove box assembly 30 is mounted in a prescribed side of the instrument panel 22 of the automobile.

Specifically, the glove box assembly 30 is mounted to the left or right side of the instrument panel 22 according to automobile standards in the country wherein is to be sold.

As shown in FIG. 2, the glove box assembly 30 is mounted in the right side of the instrument panel 22.

The glove box assembly 30 includes the housing 33 mounted to the instrument panel 22, and the lid 31b rotatably attached to the front part of the housing 33 such that the housing 33 is opened or closed by means of the lid 31b.

Specifically, the lid 31b is rotatably attached to the front part of the housing 33 such that the housing 33 is opened or closed by means of the lid 31b while the lid 31b is hinged at the lower edge of the housing 33.

To the center area of the upper part of the housing 33 is attached a striker 24 for locking the lid 31b, by means of which the front part of the housing is closed.

The knob 34b is fitted to the center area of the upper part of the lid 31b.

At this time, the knob 34b is disposed while corresponding to the striker 24 attached to the housing 33 so that the knob 34b is locked by means of the striker 24.

At the end of the knob 34b is formed a locker 36, which is selectively engaged with the striker 24.

The housing 33 is selectively mounted in the left or right side of the instrument panel 22, and the lid 31b is attached to the housing 33.

The knob 34a; 34b is properly fitted to a prescribed area on the lid 31a; 31b by means of the identifying member 100 so that incorrect assembly of the knob 34a; 34b is prevented.

As shown in FIGS. 3a and 4a, the glove box assembly 30 is mounted in the left side of the instrument panel 22 from the center of the instrument panel 22 or from the driver seat of the automobile.

At the front part of the housing 33 of the glove box assembly 30 is attached to the lid 31a.

At this time, the lid 31a is properly attached to the housing 33 by means of the identifying member 100.

The identifying member 100 comprises: a guide groove 112 formed at the inside of the lid 31a; and a guide protrusion 114 formed at the knob 34a such that the guide protrusion 114 is inserted into the guide groove 112.

The guide groove 112 is formed on the inside of the lid 31a into which the knob 34a is fitted.

The lid 31a is rotatably attached to the front part of the housing 33, mounted into the left side of the instrument panel 22. The knob 34a is only fitted on the lid 31a.

The guide protrusion 114 is formed at the knob 34a in such a manner that the guide protrusion 114 corresponds to the guide groove 112 of the lid 31a.

The guide protrusion 114 is inserted into the guide groove 112, which is depressed as shown in the drawings.

The guide groove 112 may be formed at one side on the edge of the lid 31a or at either side of the edge of the lid 31a.

When the guide protrusion 114 is inserted into the guide groove 112, it is determined that the knob 34a is properly fitted into the lid 31a.

As shown in FIGS. 3b and 4b, the glove box assembly 30 may be mounted into the right side of the instrument panel 22 from the center of the instrument panel 22 or from the driver seat of the automobile.

At the front part of the housing 33 of the glove box assembly 30 is attached to the lid 31b, as in the glove box assembly described in detail with reference to FIGS. 3a and 4a.

The lid 31b is properly attached to the housing 33 by means of the identifying member 100.

The identifying member 100 comprises: a guide groove 122 formed on the inside of the lid 31b; and a guide protrusion 124 formed at the knob 34b such that the guide protrusion 124 is inserted into the guide groove 122.

The guide groove 122 is formed at the inside of the lid 31b in which the knob 34b is fitted.

The position of the guide groove 122 formed at the inside of the lid 31b mounted in the right side of the instrument panel 22, as illustrated in FIG. 3b, is different from the position of the guide groove 112 formed on the inside of the lid 31a mounted into the left side of the instrument of the instrument panel 22, as illustrated in FIG. 3a. For example, as can be seen by a comparison of FIGS. 3a and 3b, the difference in the position of the guide groove 122 of the right side mounting with that of the guide groove 112 of the left side mounting relates to a difference in the distance of the guide groove from an edge or a center of its corresponding lid 31.

The lid 31b is rotatably attached to the front part of the housing 33 mounted in the right side of the instrument panel 22. The knob 34b is only fitted in the lid 31b.

The guide protrusion 124 is formed at the knob 34b in such a manner that the guide protrusion 124 corresponds to the guide groove 122 of lid 31b.

The position of the guide protrusion 124 of the knob 34b disposed at the right side of the instrument panel 22, as illustrated in FIG. 3b, is different from the position of the guide protrusion 114 of knob 34a disposed on the left side of the instrument panel 22, as illustrated in FIG. 3a. For example, as can be seen by a comparison of FIGS. 3a and 3b, the difference in the position of the guide protrusion 124 of the right side mounting with that of the guide protrusion 114 of the left side mounting relates to a difference in the distance of the guide protrusion from an edge or a center of its corresponding knob 34.

The guide protrusion 124 is inserted into the guide groove 122, which is depressed as shown in the drawings.

The guide groove 122 may be formed at one side of the edge of the lid 31b or at either side of the edge of the lid 31b.

When the guide protrusion 124 is inserted into the guide groove 122, it is determined that the knob 34b is properly fitted into the lid 31b.

Consequently, incorrect assembly of the glove box assembly 30 is prevented by means of the identifying member 100.

As apparent from the above description, the present invention provides a glove box assembly having an identifying member formed on the lid and knob of the glove box assembly selectively mounted into the left or right side of an instrument panel so that the knob is properly fitted in the lid, whereby incorrect assembly of the glove box assembly is prevented.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A glove box assembly for a vehicle comprising:
   a housing selectively mounted in one of left and right sides of an instrument panel with respect to a driver's seat of the vehicle;
   a lid rotatably attached to a front part of the housing;
   a knob rotatably fitted in the lid such that the housing is opened or closed by the lid; and
   an identifying member comprising a guide groove and a guide protrusion provided on a side portion of the lid and the knob respectively, wherein the guide protrusion corresponding to the right side mounting is located at a different position of the knob than the guide protrusion corresponding to left side mounting such that the guide protrusion is configured to engage with the guide groove to ensure that the knob is coupled to an appropriate one of the left side mounted housing and the right side mounted housing.

2. The glove box assembly according to claim 1, wherein the guide groove corresponding to the left side mounting is located at a different position of the lid than the guide groove corresponding to the right side mounting, the guide protrusion being configured to selectively engage with one of the guide groove corresponding to the left side mounting and the guide groove corresponding to the right side mounting.

3. The glove box assembly according to claim 1, wherein the side portion of the lid is offset from a midsection of the lid and the side portion of the knob is offset from a midsection of the knob.

4. A glove box assembly, comprising:
   a housing selectively mounted to one of a left side and a right side of a vehicle;
   a lid attached to the housing; and
   a knob attached to the lid;
   wherein the lid and the knob have identifying structures, the identifying structures comprise a guide groove provided on a side portion of the lid and a portion protruding from a side portion of the knob respectively, wherein the protruding portion corresponding to the left side mounting is located at a different position than the protruding portion corresponding to the right side mounting such that the portion protruding from a side portion of the knob is configured to engage with the guide groove to cooperate in predetermined orientations to prevent mismounting of the knob to the lid.

5. The glove box assembly according to claim 4, wherein the knob is rotatable.

6. The glove box assembly according to claim 4, wherein the knob is attached to a center area of an upper portion of the lid via the identifying structure.

7. The glove box assembly according to claim 4, wherein the groove is positioned on the portion of the lid facing the housing.

8. The glove box assembly according to claim 4, wherein the guide groove corresponding to the left side mounting is located at a different position of the lid than the guide groove corresponding to the right side mounting, the protruding portion being configured to selectively engage with one of the guide groove corresponding to the left side of the vehicle and the guide groove corresponding to the right side of the vehicle.

9. The glove box assembly according to claim 4, wherein the side portion of the lid is offset from a midsection of the lid and the side portion of the knob is offset from a midsection of the knob.

10. A glove box assembly selectively mounted on one of a left side and a right side of a vehicle, the glove box assembly comprising:
    a lid configured to open and close an opening of a housing; and
    an identifying member that identifies a knob configured to be attached to the lid based on the selected mounting side of the glove box assembly, the identifying member comprises a guide portion protruding from a side portion of the knob and a guide groove provided on a side portion of the lid, wherein the guide portion corresponding to left side mounting is located at a different position of the knob than the guide portion corresponding to the right side mounting such that the guide portion is configured to engage with the guide groove to indicate that the knob is properly attached to the lid.

11. The glove box assembly according to claim 10, wherein the knob is rotatable.

12. The glove box assembly according to claim 10, wherein the groove is located on the portion of the lid facing the housing.

13. The glove box assembly according to claim 10, wherein the guide groove corresponding to the left side mounting is located at a different position of the lid than the guide groove corresponding to the right side mounting, the guide portion being configured to selectively engage with one of the guide groove corresponding to the left side of the vehicle and the guide groove corresponding to the right side of the vehicle.

14. The glove box assembly according to claim 10, wherein the side portion of the lid is offset from a midsection of the lid and the side portion of the knob is offset from a midsection of the knob.

* * * * *